US009645638B2

(12) United States Patent
Bruderek

(10) Patent No.: US 9,645,638 B2
(45) Date of Patent: May 9, 2017

(54) DISPLAY DEVICE WITH A DIRECTION-DEPENDENT SENSOR

(71) Applicant: Fujitsu Technology Solutions Intellectual Property GmbH, München (DE)

(72) Inventor: Timo Bruderek, Augsburg (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 0 days.

(21) Appl. No.: 14/416,791

(22) PCT Filed: Aug. 2, 2013

(86) PCT No.: PCT/EP2013/066322
§ 371 (c)(1),
(2) Date: Jan. 23, 2015

(87) PCT Pub. No.: WO2014/040802
PCT Pub. Date: Mar. 20, 2014

(65) Prior Publication Data
US 2015/0177828 A1 Jun. 25, 2015

(30) Foreign Application Priority Data

Sep. 14, 2012 (DE) .................. 10 2012 108 626

(51) Int. Cl.
*G06F 3/01* (2006.01)
*G06F 1/32* (2006.01)

(52) U.S. Cl.
CPC .............. *G06F 3/01* (2013.01); *G06F 1/3231* (2013.01); *G06F 1/3265* (2013.01); *Y02B 60/1242* (2013.01); *Y02B 60/1289* (2013.01)

(58) Field of Classification Search
None
See application file for complete search history.

(56) References Cited

U.S. PATENT DOCUMENTS

| 6,418,536 | B1 | 7/2002 | Park |
| 2004/0125044 | A1 | 7/2004 | Suzuki |
| 2010/0031072 | A1 | 2/2010 | Hung et al. |
| 2010/0295839 | A1* | 11/2010 | Nagaya ................. G06F 1/3265 345/212 |
| 2011/0180686 | A1 | 7/2011 | Iwai |

(Continued)

FOREIGN PATENT DOCUMENTS

| DE | 102008050370 | 2/2010 |
| JP | 2001-324944 | 11/2001 |
| WO | 98/26585 | 6/1998 |

*Primary Examiner* — Kenneth B Lee, Jr.
(74) *Attorney, Agent, or Firm* — DLA Piper LLP (US)

(57) ABSTRACT

A display device includes at least one first direction-dependent sensor that detects the presence of at least one person in a predetermined zone in front of the display device, the at least one first sensor being mounted on a housing part, wherein the display device is pivotable about at least one axis so that orientation of the at least one first sensor is altered; at least one second sensor adapted to detect the orientation of the display device, and a control unit adapted to generate a control signal in accordance with the orientation of the display device detected by the second sensor, the control signal indicating that detection of a person by the first sensor cannot be ensured.

20 Claims, 2 Drawing Sheets

(56) References Cited

U.S. PATENT DOCUMENTS

2012/0154277 A1\* 6/2012 Bar-Zeev ............. G02B 27/017
  345/158
2013/0038212 A1\* 2/2013 Yabuta .............. G02F 1/133603
  315/113

\* cited by examiner

DISPLAY DEVICE WITH A DIRECTION-DEPENDENT SENSOR

TECHNICAL FIELD

This disclosure relates to a display device with at least one direction-dependent sensor that detects the presence of a person in a predetermined zone.

BACKGROUND

Sensors arranged on a computer system and able to detect the presence of a person are generally known. Such systems have the advantage that a person who is working on a computer system is not necessarily obliged to make inputs into the computer system to prevent adoption of a limited energy-saving operating mode, for example, the activation of a screensaver or an idle state. For this purpose, a zone in the vicinity of the computer system is detected, for example, a zone in front of a display device.

If the orientation of the sensor alters, so that it detects a zone in which a person is not present even though a person is working on the computer system, then the computer system is no longer able to detect the person. If a user ceases to enter data, it may happen that the computer system is put into an idle state or a sleep state, even though a user is using the computer system passively, for example, by reading an article on the display device.

SUMMARY

I provide a display device including at least one first direction-dependent sensor that detects the presence of at least one person in a predetermined zone in front of the display device, the at least one first sensor being mounted on a housing part, wherein the display device is pivotable about at least one axis so that orientation of the at least one first sensor is altered; at least one second sensor adapted to detect the orientation of the display device, and a control unit adapted to generate a control signal in accordance with the orientation of the display device detected by the second sensor, said control signal indicating that detection of a person by the first sensor cannot be ensured.

BRIEF DESCRIPTION OF THE DRAWINGS

Various examples are described hereafter with reference to the appended figures.

LIST OF REFERENCE SIGNS

Figure 1:
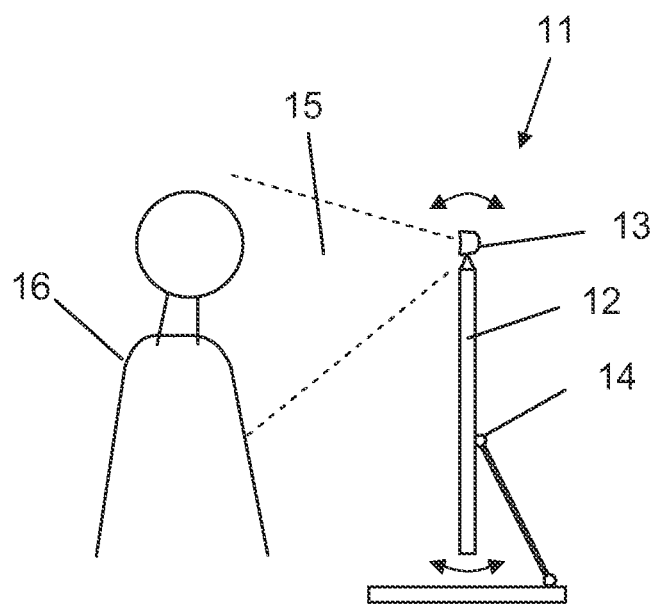
FIG. 1 shows an arrangement of a pivotable display device, which has a first sensor

11 Display device
12 Housing part
13 Sensor
14 Axis
15 Predetermined detection zone
16 Person
21 Display device
22 Sensor
23 Second sensor
24 Control unit
25 Screen
26 Data processing facility
27 Evaluation circuit
28 Detection circuit

DETAILED DESCRIPTION

I provide a display device adapted such that the display device and/or a computer system connected to the display device is not wrongly put into an energy-saving mode in which a user is no longer able to use the display device and/or the computer system.

The display device may thus comprise at least one first direction-dependent sensor that detects the presence of at least one person in a predetermined zone in front of the display device, the at least one first sensor being mounted on a housing part, wherein the display device is pivotable about at least one axis such that the orientation of the sensor is altered. The display device may further comprise at least one second sensor adapted to detect the orientation of the display device. The display device connects to a control unit which, in accordance with the acquired signal of the second sensor, generates a control signal that indicates that detection of a person by the first sensor cannot be ensured.

By the control signal it is possible, for example, to switch off the first sensor so that the computer system does not wrongly assume that there is no-one in the predetermined zone. Another option is to inform the user of the computer system by the display device that the first sensor has been moved out of its position and that detection of the person can no longer be ensured. It can now be left to the user to orientate the sensor or the display device differently or to switch off the sensor or the monitoring function thereof.

Advantageously, the first sensor may be an ultrasonic sensor. An ultrasonic sensor is able to detect a limited zone in a predetermined direction so that other persons who are in the vicinity, but who are to be excluded from the detection, are not detected.

Further advantageously, the second sensor that detects the orientation of the display device may be an acceleration sensor, which detects acceleration due to gravity. This has the advantage that low-priced, commercially available acceleration sensors can be used. The calculation of the orientation of the display device can then be effected by calculations using simple mathematical formulae known per se.

Advantageously, the control unit may comprise a detection circuit and connects to an evaluation circuit arranged in a data processing facility connected to the display device. One advantage is that as a result of transferring to a data processing facility, use can be made of a microcontroller present therein, so that no additional control logic needs to be implemented.

Further advantageously, the control unit may be adapted to switch off the first sensor and/or to display a warning. If, for example, the orientation of the sensor is such that is can detect no-one, then the sensor is automatically switched off. Optionally or alternatively, a warning can be displayed to a user.

Further advantageously, the control signal may be an optical and/or an acoustic signal. As a result, a user can be informed, for example, by an LED lighting up or by another optical signal, that the sensor orientation has been altered. Alternatively or additionally, for example, a signal tone may sound, which provides the user with the same information.

Further advantageously, the control unit can generate a dialog box on the display device to give the user the opportunity to respond this dialog box. The content of the dialog box may be that a corrected orientation of the display device is displayed to the user or the user is given the opportunity to switch off the first sensor manually. An advantage of such a display is to give the user several options to control the system.

The illustration according to FIG. 1 schematically shows a display device 11, which comprises a housing part 12 on which a sensor 13 is mounted for the purpose of detecting the presence of at least one person 16 in a predetermined zone 15 in front of the display device 11. The housing part 12 on which the sensor 13 is mounted is pivotable about at least one axis 14. Although the sensor 13 in the illustration is mounted above the housing 12, any conceivable position in the region of the display device 11 is, of course, possible. A second sensor, not illustrated in the drawing, is integrated in the housing part 12, so that it is able to detect an alteration in the orientation of the housing part 12. The sensor 13 detects in the predetermined zone 15 the presence of at least one person 16.

The housing part 12 of the display device 11 can be tilted excessively, for example, to orient the display device 11 horizontally to be able to enter inputs on a touch-sensitive screen more easily. In this case, it may happen that the zone in which the sensor 13 is able to detect persons is facing in a direction other than the direction in which persons are typically present. In that case, a data processing unit connected to the display device 11 would wrongly detect that no person 16 is in the zone 15 of the display device 11. As a consequence, it would possibly enter an energy-saving mode, in which the user 16 is no longer able use the display device 11 or the data processing unit connected thereto.

To allow continued use of the display device 11, a further second sensor, not illustrated, in particular an acceleration sensor, is integrated in the housing part 12, which detects acceleration due to gravity and is thus able to detect the above-mentioned situations, as follows. If the housing part 12 is moved out of its position, then the position of the second sensor relative to the direction of the acceleration due to gravity is likewise altered and a changed detected strength of the acceleration due to gravity is established. By the changed detected strength of the acceleration due to gravity the angle of the housing part 12 can now be determined using mathematical means known per se. Should the detection range of the sensor 13 now no longer show a person 16 who is located in front of the display device 11, then a control unit that is arranged in the display device 11 can provide a control signal which indicates that detection by the sensor 13 can no longer be ensured.

In the example described, the sensor 13 is an ultrasound sensor, which has a directed detection range. As a result, on the one hand no further persons in the vicinity are detected, merely the person 16 who is located in front of the display device. On the other hand, changes in the orientation of the display device 11 mean that in some circumstances a user 16 of the display device 11 might not be detected. In the example described, the user 16 can be made aware of such a situation.

Figure 2:
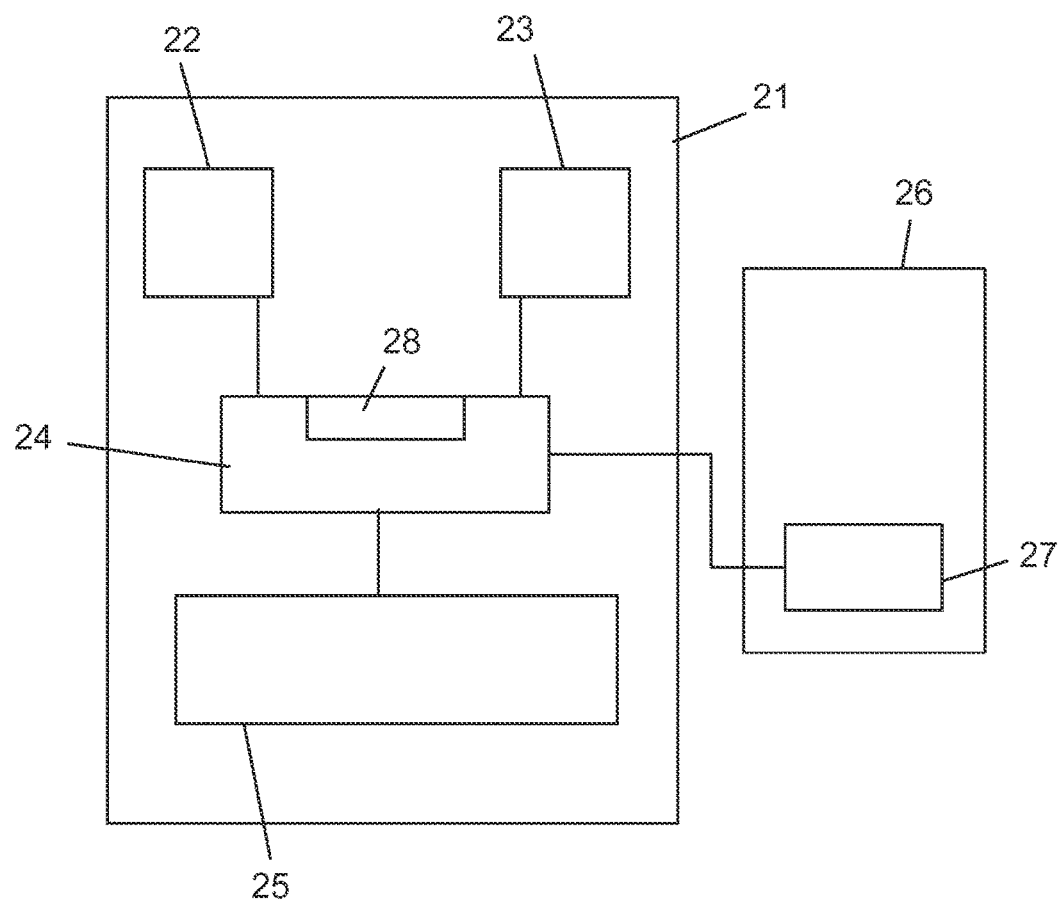
FIG. 2 shows a block diagram of an arrangement of sensors.

FIG. 2 shows a possible arrangement for a display device 21, on which a first sensor 22, in particular a presence sensor, and a second sensor 23, in particular an acceleration sensor, are arranged. The two sensors 22 and 23 connect to a control unit 24 for the purpose of data exchange. The display device 21 further comprises a screen 25. Attached to the display device 21 is a data processing unit 26, which has an evaluation circuit 27 connected to the control unit 24. The control unit 24 comprises at least one detection circuit 28.

During normal use of the display device 21, the sensor 22 detects the presence of a person in a predetermined zone, for example, within a predetermined angular detection zone perpendicularly in front of a display zone. If the person moves out of this zone, then the sensor 22 delivers a signal indicating the absence of a person. The data processing facility 26 and/or the display device 21 can now enter an energy-saving state.

If, however, the person does not move out of the zone, but the display device 21 is deflected such that a person can no longer be detected, then the second sensor 23 delivers a signal that indicates a position change of the display device 21. Owing to the acquired signal of the second sensor 23, the detection circuit 28 of the control unit 24 now detects that the orientation of the display device 21 has changed. The control unit 24 transmits a corresponding control signal to the evaluation circuit 27. If the evaluation circuit 27 determines that the deflection of the display device is so large that detection of a user can no longer be ensured, for example, because an inclination angle of the display zone determined by the sensor signal of the second sensor 23 is greater than a predetermined maximum inclination angle, the evaluation circuit 27 and/or the control unit can respond in a suitable manner.

For example, the control unit 24 can now present related information on the screen 25 for a user. This information can contain, for example, a dialog box, in which the user is informed that the deflection of the display device was so large that the sensor 22 can no longer detect a user.

The control unit 24 can also be adapted to switch off the sensor 22 when the second sensor 23 indicates a position change of the display device 21, which has the effect that the sensor 22 is no longer able to detect a person.

Another way of alerting the user to the fact that the detection range of the sensor 22 lies outside a predetermined zone is to provide an optical and/or acoustic signal via the control unit 24. This can be, for example, a signal tone of a loudspeaker of the data processing unit 26 or an LED on the display device 21 lighting up.

In the example described, the control unit 24 can display comprehensive information or a dialog box to a user on the screen 25 of the display device 21. This dialog box can point out to the user, for example, that he can re-orientate the display device 21 or manually switch off the sensor 22. With this option, the user is given a high degree of control over the system. The user can thus decide whether he/she wishes to return the display device 21 to its initial position again or whether he/she wishes to deactivate the sensor 22 to use the display device 21 in a different orientation.

The invention claimed is:

1. A display device comprising:
   at least one first direction-dependent sensor for detecting the presence of at least one person in a presence zone in front of the display device, the at least one first sensor being mounted on a housing part, wherein the first sensor has a detection zone comprising at least part of the presence zone in which the at least one person in front of the display device is present and a zone outside of the presence zone, and the display device is pivotable about at least one axis so that orientation of the at least one first sensor is altered;
   at least one second sensor adapted to detect the orientation of the display device, and
   a control unit adapted to generate a control signal in accordance with the orientation of the display device detected by the second sensor, said control signal indicating when the first sensor is oriented toward the zone outside of the presence zone and detection of a person in the presence zone by the first sensor cannot be ensured.

2. The display device according to claim 1, wherein the at least one first sensor is an ultrasonic sensor.

3. The display device according to claim 1, wherein the at least one second sensor is an acceleration sensor, which, to detect the orientation of the housing part, detects a direction or magnitude of acceleration due to gravity.

4. The display device according to claim 1, wherein the control unit comprises a detection circuit and connects to an evaluation circuit in a data processing facility connected to the display device.

5. The display device according to claim 1, wherein the control unit is adapted to switch off the at least one first sensor and/or to display a warning.

6. The display device according to claim 1, wherein the control signal is an optical and/or an acoustic signal.

7. The display device according to claim 1, wherein the control unit generates a dialog box on the screen of the display device which points out to a user the possibility of correcting the orientation of the display device and/or gives the user the opportunity to switch off the at least one first sensor.

8. The display device according to claim 2, wherein at least one second sensor is an acceleration sensor, which, to detect the orientation of the housing part, detects a direction or magnitude of acceleration due to gravity.

9. The display device according to claim 2, wherein the control unit comprises a detection circuit and connects to an evaluation circuit in a data processing facility connected to the display device.

10. The display device according to claim 3, wherein the control unit comprises a detection circuit and connects to an evaluation circuit in a data processing facility connected to the display device.

11. The display device according to claim 2, wherein the control unit is adapted to switch off the at least one first sensor and/or to display a warning.

12. The display device according to claim 3, wherein the control unit is adapted to switch off the at least one first sensor and/or to display a warning.

13. The display device according to claim 4, wherein the control unit is adapted to switch off the at least one first sensor and/or to display a warning.

14. The display device according to claim 2, wherein the control signal is an optical and/or an acoustic signal.

15. The display device according to claim 3, wherein the control signal is an optical and/or an acoustic signal.

16. The display device according to claim 4, wherein the control signal is an optical and/or an acoustic signal.

17. The display device according to claim 5, wherein the control signal is an optical and/or an acoustic signal.

18. The display device according to claim 2, wherein the control unit generates a dialog box on the screen of the display device which points out to a user the possibility of correcting the orientation of the display device and/or gives the user the opportunity to switch off the at least one first sensor.

19. The display device according to claim 3, wherein the control unit generates a dialog box on the screen of the display device which points out to a user the possibility of correcting the orientation of the display device and/or gives the user the opportunity to switch off the at least one first sensor.

20. The display device according to claim 4, wherein the control unit generates a dialog box on the screen of the display device which points out to a user the possibility of correcting the orientation of the display device and/or gives the user the opportunity to switch off the at least one first sensor.

* * * * *